US012675480B2

(12) United States Patent
Agarwal et al.

(10) Patent No.: US 12,675,480 B2
(45) Date of Patent: Jul. 7, 2026

(54) DYNAMIC AI SYSTEM FOR CONTEXT-AWARE, DOMAIN-SPECIFIC TASKS

(71) Applicant: Celligence International LLC, Guaynabo, PR (US)

(72) Inventors: Pavan Agarwal, Dorado, PR (US); Gabriel Albors Sanchez, San Juan, PR (US); Jonathan Ortiz Rivera, San Juan, PR (US); Dennis J. Borrero, San Juan, PR (US); Arindam Brahma, Aliso Viejo, CA (US)

(73) Assignee: Celligence International LLC, Guaynabo, PR (US)

( * ) Notice: Subject to any disclaimer, the term of this patent is extended or adjusted under 35 U.S.C. 154(b) by 0 days.

(21) Appl. No.: 18/898,574

(22) Filed: Sep. 26, 2024

(65) Prior Publication Data

US 2026/0087010 A1      Mar. 26, 2026

(51) Int. Cl.
*G06F 16/2453* (2019.01)
*G06N 3/0895* (2023.01)

(52) U.S. Cl.
CPC ..... *G06F 16/24542* (2019.01); *G06N 3/0895* (2023.01)

(58) Field of Classification Search
CPC ............. G06F 16/24542; G06F 16/243; G06F 16/2425; G06F 16/3329; G06F 16/3338; G06F 16/90332; G06F 16/9532; G06F 40/30; G06F 16/24522; G06F 16/2455; G06F 16/33295; G06F 40/284; G06F 40/40; G06N 3/0895
USPC ........................................................ 707/706
See application file for complete search history.

(56) References Cited

U.S. PATENT DOCUMENTS

| | | | | |
|---|---|---|---|---|
| 12,306,834 | B1 * | 5/2025 | Ferchau | G06F 16/24542 |
| 2023/0334249 | A1 * | 10/2023 | Kumar | G10L 15/16 |
| 2024/0354503 | A1 * | 10/2024 | Baruch | G06F 16/345 |
| 2025/0110957 | A1 * | 4/2025 | Baldua | G06F 16/2425 |
| 2025/0284683 | A1 * | 9/2025 | Modelo-Howard | G06F 16/243 |

OTHER PUBLICATIONS

PCT International Search Report and the Written Opinion mailed Jan. 15, 2026, issued in International Application No. PCT/US2025/048290 (15 pages).

* cited by examiner

*Primary Examiner* — Evan Aspinwall

(74) *Attorney, Agent, or Firm* — Sheppard Mullin Richter & Hampton LLP

(57) ABSTRACT

The described system provides a novel, efficient, and scalable approach to using LLMs for domain-specific applications. By combining a pre-trained LLM model with a semantic search engine and a range of specialized modules, the system overcomes the limitations of traditional LLM-based systems. It offers accurate, context-aware responses to domain-specific queries without the need for costly retraining, making it an ideal solution for dynamic and complex business environments.

18 Claims, 5 Drawing Sheets

Query 352:

Augmenting Content Retrieved 316:

Query Response 354:

DYNAMIC AI SYSTEM FOR CONTEXT-AWARE, DOMAIN-SPECIFIC TASKS

BACKGROUND

Artificial Intelligence (AI) is a broad field of developing machines and software that can perform tasks requiring human intelligence. Machine Learning (ML) is a subset of AI focused on building systems that learn from data to improve performance over time. Deep Learning (DL) is a branch of ML that uses neural networks with many layers (hence, "deep") to model complex patterns in data. Natural Language Processing (NLP) is a subfield of AI and DL focused on the interaction between computers and human (natural) languages. NLP enables computers to understand, process, and generate language used by humans. NLP includes techniques that are implemented on a computer to perform language-related tasks, such as retrieving and searching for information on a wide range of topics. For example, NLP may employ a variety of models when processing and understanding language.

For example, Neural Language Models (NLM) use neural networks to understand and generate human language. The primary goal of an NLM is to model language itself. It is focused on capturing the statistical properties and patterns of natural language to perform tasks such as text generation, auto-completion, and translation. NLMs are typically trained on vast amounts of text data using deep learning techniques, particularly neural networks. The training process involves learning the statistical distribution of words and their contexts. NLMs are typically used for text generation, machine translation, autocompletion and predictive typing, summarization, and similar tasks.

LLM (Large Language Model) is a specific type of NLM within the field of NLP that leverages large datasets and complex neural networks to perform sophisticated language tasks (both in terms of the number of parameters and the volume of training data). LLMs are typically deep learning models that have been trained on extensive corpora to perform a wide range of NLP tasks. A trained model will periodically need to be re-trained to update or refine its knowledge based on new data, adjust to domain-specific tasks, or correct its performance. Thus, model's ability to continuously performs with high level of accuracy (i.e., the proportion of correctly predicted instances (both true positives and true negatives out of the total number of instances), precision (i.e., the proportion of true positive predictions out of all the positive predictions made by the model), and/or other similar metrics, depends on large amounts of computing resources.

The disclosed system overcomes these limitations by integrating multiple components into a flexible and dynamic architecture, enabling efficient, real-time interaction with minimal computational requirements.

SUMMARY

In accordance with one or more embodiments, the disclosed system comprises a dynamic AI architecture that leverages a pre-trained large language model (LLM) in conjunction with a procedural function management framework, semantic search engine, and content retrieval modules. The system provides accurate, context-aware responses to user queries without requiring the extensive retraining typically associated with domain-specific applications of LLMs. The system achieves this by dynamically constructing and executing functions and prompts, enabling efficient use of computing resources while maintaining scalability and adaptability to new tasks and data.

Various features and functionality can be provided for context-aware, domain-specific query response and sentiment analysis system. The system includes a chat interface for receiving user queries, a Q&R endpoint application programming interface ("API") configured to handle query-response tasks; a sentiment predictor endpoint application programming interface ("API") for handling user sentiment; and a pre-trained LLM (PT-LLM) configured to operate in multiple modalities and/or ecosystems. The conversation engine includes a classification model for determining user's intent or action, an extraction model for extracting parameters or entities associated with user's intent or action, and a procedural function engine for dynamically generating and managing procedural functions based on the extracted parameters. The procedural functions include user sentiment prediction and response generation (e.g., via a sentiment prediction engine); coordinating content retrieval and LLM activation (e.g., via a chat orchestrator engine), retrieving content (e.g., via an augmenting content retriever (ACR) which retrieves content from an augmenting content store (ACS)); constructing prompts for the LLM (e.g., via a dynamic augmented prompt builder (DAPB).

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3 illustrates an example response generated by an exemplary illustrative context-aware, domain-specific query answering and sentiment analysis system, according to an implementation of the disclosure.

Figure 1A:
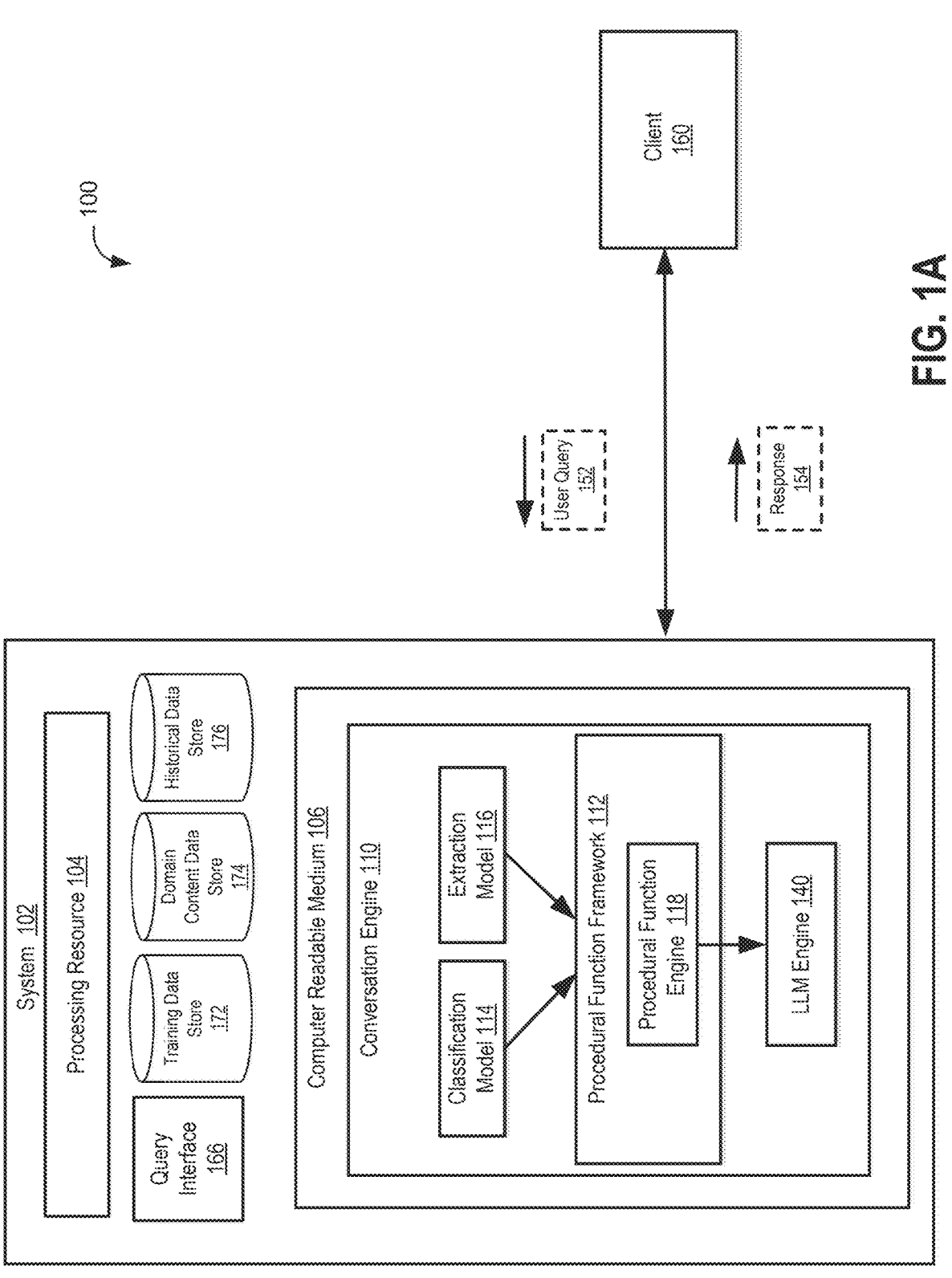
FIG. 1A depicts a network including a context-aware, domain-specific query answering and sentiment analysis system for responding to user queries, according to an implementation of the disclosure.

Described herein are systems and methods for context-aware, domain-specific query answering and sentiment analysis. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As alluded to earlier, to understand, process, and generate language used by humans, Natural Language Processing (NLP) employs a variety of models, including Neural Language Models (NLM) for processing and understanding natural language.

This encompasses a wide range of models and algorithms designed for various NLP tasks such as text classification, sentiment analysis, machine translation, and more. Traditional models include n-grams, Hidden Markov Models (HMMs), and earlier forms of neural networks used for NLP tasks. Modern models include any neural network-based models designed for understanding and generating human language, such as RNNs (Recurrent Neural Networks), LSTMs (Long Short-Term Memory networks), and transformers.

LLM is a specific type of NLM trained on vast amounts of text data to understand and generate language with high accuracy. LLM is characterized by its large size, both in terms of the number of parameters and the volume of training data. LLMs are typically deep learning models that have been trained on extensive corpora to perform a wide range of NLP tasks. These models use deep learning architectures, such as transformers, to process and generate text.

A transformer is a type of deep learning model which become the foundation for many state-of-the-art NLP models, including GPT-3 (Generative Pre-trained Transformer), BERT, and T5. The transformer architecture has revolutionized NLP by enabling models that can handle complex language tasks with high performance and scalability. Transformer allows the model to weigh the importance of different words in a sentence relative to each other, regardless of their position. This is crucial for understanding context and dependencies in language. Transformers can be scaled up to very large sizes (hence "large language models"), which allows them to learn from vast amounts of text data and perform a wide range of NLP tasks with high accuracy.

LLMs, often based on transformer architecture, are pre-trained on diverse pre-training datasets. This initial pre-training phase enables the model to learn general language patterns, structures, and knowledge, which can then be fine-tuned for specific tasks or applications. After pre-training on general data, models are often fine-tuned on smaller, more specific datasets to adapt them to particular tasks or domains. Fine-tuning adjusts the model parameters based on the new data, allowing it to perform specialized tasks with higher accuracy.

Training LLMs, involves intensive computational processes that require significant computing resources. One of the most critical resources for training these models is the GPU (Graphics Processing Unit). GPUs are the preferred hardware for training LLMs due to their ability to perform parallel computations efficiently. Training large-scale LLMs can take weeks or months, even on high-performance hardware, and can cost millions of dollars in compute resources.

Natural Language Understanding (NLU) is a subfield of NLP that focuses specifically on comprehending and interpreting the meaning and intent behind human language. NLU aims to enable machines to understand the semantic content and context of text or speech as a human would. The main objective of NLU is to understand the intent, entities, and relationships in a piece of text to enable machines to interact with humans in a more meaningful way. It aims to extract structured information from unstructured text and make sense of the underlying meaning. NLUs are typically used for virtual assistants, chatbots and customer service automation, sentiment analysis for social media or customer feedback, information retrieval and question answering.

Presently disclosed system includes a conversation engine with a flexible and dynamic AI architecture designed to handle complex user interactions in real-time with a high level of accuracy, while minimizing the computational resources typically required by traditional GPU-intensive Large Language Models (LLMs). Unlike traditional NLP models that demand significant computing power for training on specific datasets, the present system is lightweight and uses minimal CPU and GPU resources. This efficiency is achieved through its dynamic response generation approach rather than relying on a pre-trained single-purpose model.

The present system combines several interconnected components to dynamically create procedural functions, handle multiple datasets, and integrate with external systems, providing more contextually appropriate and tailored responses. In particular, the system includes: (i) classification and extraction models for intent (action triggers) and entity (parameter) recognition, embedded within a procedural function management framework, (ii) a sentiment analysis model, that detects user sentiment in real time without requiring retraining, (iii) a semantic search engine that retrieves semantically relevant content from a pre-stored domain-specific repository, and (iv) a content retrieval and content augmentation tools that dynamically construct prompts for the LLM based on user queries and domain-specific content.

These components work cohesively to interpret user input, execute appropriate actions, and generate accurate, context-aware responses. By embedding classification and extraction models—common to Natural Language Understanding (NLU) but not typically found in Natural Language Processing (NLP)—within a procedural function framework, the system achieves contextual accuracy with a lightweight, pre-trained LLM, rather than relying on the GPU-intensive models used in traditional NLP frameworks.

The system introduces several technical improvements, including enhanced scalability and adaptability. It can grow and evolve by dynamically generating new functions as needed, allowing it to handle new tasks or datasets without the need for retraining the entire model from scratch. Additionally, it can integrate new data sources and accommodate various business scenarios with minimal additional effort, providing a robust and versatile solution for domain-specific applications.

FIG. 1A illustrates an example network 100 including a system 102 and a client computing device 160. The system 102 receives a query 152 from a client 160 over the network 100. In some examples, the network 100 is a distributed network where the system 102 and client 160 are located at physically different locations (e.g., on different racks, on different enclosures, in different buildings, in different cities, in different countries, and the like) while being connected via the network 100. In other examples, any combination of the system 102 and the client may be co-located, including running as separate virtual devices on the same physical device.

In FIG. 1A, although the network 100 is shown to include one system 102 and a client 160, the network 100 may include any number of systems and clients, without limiting the scope of the present disclosure. The system 102 is a heterogeneous computing system including an example processing resource 104 and an example machine-readable medium 106. The processing resource 104 may include different types of processing units (also referred to as service provider resources), such as Central Processing Unit (CPU), Graphical Processing Unit (GPU), and the like. The machine-readable medium 106 includes memory resources (e.g., cache memory), storage resources (e.g., non-volatile storage devices), and the like. The machine readable medium 106 stores conversation engine 110.

The conversation engine 110 is executable by the processing resource 106 to determine response(s) to the queries 152 using a classification model 114 and extraction model 116 which is integrated with a procedural function framework 112 that includes a procedural function engine 118, and a pre-trained LLM 120. Training data may be stored in a training store 172. Domain-specific content data including both structured data stored in databases (e.g., customer records, product information, transaction data, etc.) and unstructured or semi-structured content that is not stored in traditional databases (e.g., documents, reports, manuals, or internal knowledge bases) may be stored in a unified content data store 174. Training data stored in data store 172 may be a subset of the domain-specific content. In some embodiment, training data and domain-specific data may be stored in the same database 172. Data from previous user interactions, such as past queries, generated responses, detected intents, extracted entities, and sentiment analysis results may be stored in a historic data store 176.

In some embodiments, a distributed query application 166 may be operable by processing resource 104 configured to execute machine-readable instructions of machine-readable medium 106 comprising applications, engines, or modules, including computer program components. In some embodiments, the computer program components may include the conversation engine 110 and/or other such components. The corresponding client query application (not illustrated) may be configured to provide client functionality to enable a user to enter queries or questions 152 via a chat-based interface and receive responses 154 to those queries via a user interface provided on client computing device 160.

In some embodiments, client computing device 160 may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices. In some embodiments, client computing device 160 may present content to user 150 and receive customer message input.

The conversation engine 110 defines a software architecture to execute components on the system 102 for determining answers to queries, e.g., query 152. Each component may perform an operation for processing query 152. The query 152 may be provided as input to a classification model 114 and extraction model 116 which may in turn provide their input to procedural function framework 112. The procedural function framework 112 which is integrated with the classification model 114 and extraction model 116 may receive the output generated by models 114 and 116 as input via its procedural function engine 118. In some examples, the procedural function framework 112 may include the pre-trained LLM 140. The output of the procedural function framework 112 may include the response 154 to query 152.

In some embodiments, the classification model 114 is configured to identify the user's goal or purpose behind a query or input. In speech processing, detecting the goal or purpose means identifying what the user wants to achieve or communicate with their utterance. The classification model 114 detects and categorizes multiple intents from a given input. The classification model 114 helps in guiding the conversation engine 110 to understand which dataset or function to use to respond appropriately to the user's query. In some embodiment, the classification model 114 provides the first layer of understanding to ensure the system knows the user's objective, which directs the flow of information processing. The classification model 114 uses machine learning algorithms, such as natural language processing (NLP), to analyze text and classify it into predefined categories (e.g., "apply for a loan," "make a reservation," "report an issue," etc.). In some embodiments, the NLP models used for classification tasks in include Logistic Regression (e.g., a model for binary classification tasks), Support Vector Machines (SVMs) (e.g., for separating data into different categories), Neural Networks (e.g., deep learning models like RNNs, Long Short-Term Memory (LSTM) networks, and transformers, which are particularly effective in handling complex language tasks), and other similar models. Once the intent is determined, the procedural function framework 112 uses this information to decide which specific procedural function or set of functions (cells) should be executed to fulfill the user's request.

In some embodiments, the classification model 114 may use supervised learning techniques where it is trained on labeled data. For example, a dataset containing user queries and their corresponding intents is used to train the model. The model 114 learns from this data to predict the correct intent of new, unseen queries. It may also employ advanced NLP techniques, such as transformers or recurrent neural networks (RNNs), to understand the context and nuances of human language. In other words, the model 114 has learned to classify input based on pre-annotated examples. In some embodiments, labeled data may be stored in training data store 172 and include manually labeled or annotated data to indicate the correct user intent (i.e., action that the model should be taking) for specific tasks and to provide explicit examples for the model to learn from. The labeled training data stored in training data store 172 may include a subset of domain-specific content, e.g., stored in data store 174. In other embodiments, training data and domain-specific data may be stored in the same database 172.

Additionally, the labeled data may include a manually labeled micro-intent and an action attribute. The labeled data may be domain-specific and directly tied to a particular task (e.g., obtaining loan-related information). For example, intent identification data may have labels indicating the specific user intent that can be associated with each sentence.

Once the training data has been labeled, it can be used to train the classification model 114 to process labeled user queries to determine user intent.

Consider the exemplary labeled training data:

```
"model": "databasename"
"intent": "loan_info",
"microIntent": "get_loan_info",
"samples": [
    "What is the status of my loan?",
    "I need to know the status of my loan.",
    "Tell me the status of my loan"
],
"action": "Given a loan number, get the value of any entity found in the query",
"active": true,
}
```

The exemplary labeled training data has been labeled using a plurality of attributes including: "model," "intent," "microIntent," "samples," "action," and "active."

The "model" attribute identifies a particular dataset (e.g., 'databasename'). By using different data sets allows the conversation engine 110 to build different models with different datasets. Multiple algorithms can be created for specific models without affecting other models and their data.

The "intent" attribute 'loan_info' is a global category for the micro-intent attribute. It allows to categorize related intents more easily.

The "micro-intent" attribute 'get_loan_info' is applied by the third model to the user's query when generating the response.

The "samples" attribute is the user's query data. Here the user's query is 'What is the status of my loan? I need to know the status of my loan. Tell me the status of my loan.' The "samples" attribute is composed of multiple sentences which are closely related to the "micro-intent" attribute. The "samples" is the most important attribute in the labeled data. That is because any bad or unrelated sentence can throw the model off by providing unrelated intents.

The "action" attribute is a description of what the "micro-intent" attribute is set out to achieve once identified. The value of the "action" attribute can be used to generate or formulate an action that can be executed by the third model.

In some embodiments, the "action" attribute may be configured to cause the procedural function engine 118 to generate a command which would then be executed by the conversation engine 110. Finally, the "active" attribute activates or deactivates the "intent" attribute. Any change on the data requires the model to be re-trained.

The classification model 114 learns from the sample data which has been labeled. The more sample data is provided to the model the more accurate the model will be at detecting a particular intent.

In some embodiments, each user query of the labeled data may be broken down into tokens which are tagged with the intent they are associated with. The more user queries (i.e., sentences) are associated with an intent the more accurate the model becomes.

In some embodiments, a weight may be assigned to a query based on the number of tokens. For example, if a sample sentence is broken down into 5 words, then the weight of the sample for that intent is assigned a weight of 5.

Consider the excerpt comprising the labeled data, including "tokens," "weight," and "baseline" attributes:

```
IntentModel {
    intent: 'get_loan_info',
    tokens: [ 'what', 'is', 'status', 'loan' ],
    weight: 4,
    baseline: 2
},
```

The "tokens" attribute includes the terms 'what,' 'is,' 'status, and 'loan.' Based on the number of tokens (i.e., 4 tokens) the "weight" attribute is assigned the value of '4.' The baseline value is given the value of '2.'

At runtime, the classification model 114 compares the weight of the user query to the weight of the sample sentence. For example, the number of input words in a user query may be compared with the number of tokens of the labeled sample sentence. If the weight of the user query is equal to or greater than the weight of the sample query, then the classification model 114 determines that the intent has been detected. If the weight check fails, then a baseline is used to determine a possible intent. The baseline can be increased or decreased to manage accuracy.

The extraction model 116 is used to identify and extract parameters (or entities) from the user's input. Parameters (or entities) are specific pieces of information or data points that provide context or details necessary to complete the action associated with the detected intent (e.g., names, dates, locations, quantities) of the user made by model 114. In speech processing, identifying parameters (or entities) means extracting meaningful and relevant pieces of data from the user's input. The extraction model 116 tags relevant parameters (or entities) in the input text and extracts a set of query parameters associated with the identified query intent. In some embodiments, the extraction model 116 may obtain parameters from a domain-specific database.

The extraction model 116 uses machine learning algorithms, such as natural language processing (NLP), to o recognize and extract these parameters (or entities) from text. In some embodiments, the NLP models used for classification tasks in include Named Entity Recognition (NER): (e.g., a model for binary classification tasks), Conditional Random Fields (CRF) (e.g., a probabilistic model often used for structured prediction, particularly effective for sequence tagging tasks like entity extraction), Neural Networks (e.g., Recurrent Neural Networks (RNNs), Long Short-Term Memory (LSTM) networks, and transformers, which can handle complex patterns in language and context), Named Entity Recognition (NER) Models (e.g., based on machine learning algorithms like CRFs, HMMs (Hidden Markov Models), or deep learning approaches), Transformer-Based Models: Such as BERT (Bidirectional Encoder Representations from Transformers) or GPT (Generative Pre-trained Transformer), which can understand context and extract entities with high accuracy, and other similar models. The extracted parameters (or entities) serve as parameters or arguments for the procedural functions of procedural framework 112 that are executed. The procedural function framework 112 dynamically uses these parameters (or entities) to ensure that the correct data is used in each function.

The extraction model 116 may be trained using supervised learning techniques with labeled datasets, where the training data includes examples of text annotated with the entities that the model needs to recognize. The labeled training data used to train the extraction model 116 is described above, in reference to the classification model 114. Consider an exemplary labeled training data object shown below which may be used by to train the extraction model 116 to generate query parameters. The labeled data object may be generated by translating any database schema.

```
{
    "model": "database",
    "name": "loanStatus",
    "synonyms": [
        "loan status"
    ],
    "words": [
        "approved",
        "denied"
    ]
    "metadata": {
        "endpoint": "/live/loan/@loan"
    },
    "active": true,
}
```

The exemplary labeled data object has been labeled using a plurality of attributes including: "model," "name," "synonyms", "words," "metadata," "endpoint," and "active."

The "model" attribute serves the same purpose as in the exemplary labeled data used by the classification model 114, i.e., it identifies a particular dataset.

The "name" attribute is a field name within the database schema of the data set identified by the "model" attribute or the name of the parameter. The "name" attribute may be identified by the extraction model 116 based on the intent detected by the classification model 114. The value of the "name" attribute is the output of the model 116 and identifies parameter of the query. In some embodiments, the parameter output may be closely related to the intent or action output of model 114. In the exemplary labeled data, the "name" attribute has a value is 'loanStatus'. because the identified "micro-intent" attribute by the classification model 114 had the value of 'get_loan_info.'

Next, the "synonyms" attribute(s) includes all grammatically correct words that can aid in identifying the "name" attribute. In the exemplary labeled data, "synonyms" attribute has a value of 'loan status.' In some embodiments, the "synonyms" attribute may be determined using the "name" attribute, if it is descriptive enough. For example, if the "name" attribute has a value 'loanAmount,' then the extraction model 116 can identify synonyms as 'loan amount'. The extraction model's 116 accuracy increases by training the extraction model 116 with more words and synonyms.

The "words" attribute contains words that provide value to the "name" attribute, i.e., a field in a database schema or the parameter name. For example, in a database schema, the value of the status of the loan field (i.e., the "name" attribute) may be "approved" or "denied". Thus, the "word" attributed having the value 'approved' is associated with the "synonyms" attribute 'loan status' by virtue of the "name" attributed having the value 'loanStatus,' as discussed above.

The "metadata" attribute may be used to store any arbitrary data. In the exemplary labeled data, the "metadata" attribute includes an "endpoint" attribute which includes a value of an API which allows the extraction model 116 to have a direct link to a content database (e.g., unified content data store 174).

The extraction model 116 may be configured to learn from the "synonyms" and "words" attributes. For example, "synonyms" attribute helps the extraction model 116 to better identify the parameters in a sentence, while the "words" attribute helps the extraction model 116 to better identity possible values for those parameters.

In some embodiments, the training data may include a "words" attribute tagged with the parameter name. Consider an exemplary labeled training labeled data object used to train the extraction model 116 having a tag:

```
ExtractionModel {
    name: 'loanStatus',
    synonyms: [ 'loan status', 'loanStatus' ],
    words: { approved: 'LoanStatus', denied: 'LoanStatus' },
    metadata: { endpoint: '/live/loan/@loan', score: 0.5 }
```

In the exemplary labeled training data, the "words" attribute value (e.g., 'approved' or 'denied') is tagged with the parameter value "tag" (e.g., 'LoanStatus'). When the runtime model 116 detects that the "word" attribute has been tagged, then the model 116 determines that the value of the "word" attribute is the value of the "name" attribute, i.e., the parameter value or entity.

The "metadata" attribute may include an additional attribute. For example, in the exemplary labeled training data object above, the metadata" attribute contains a "score" attribute having the value '0.5.' The "score" attribute may be used to determine the proximity of the relationship between the value of the "word" attribute, the value of the "name" attribute and or the value of the "synonyms" attribute. This value of the "score" attribute may be modified (e.g., either increased or decreased) to manage accuracy.

The procedural function framework 112 leverages both the classification model 114 (for detecting intents) the extraction model 116 (for identifying entities) to understand user queries and uses engine 118 which creates and executes procedural functions based on the detected user intent and entities to identify the user's intent. For example, based on the identified intent, engine 118 determines which functions or workflows need to be executed by engine 118 to address the identified intent. In some embodiments, this selection may be based on predefined mappings between detected intents and the available functions. In other embodiments, engine 118, may dynamically determine and generate the functions. Simultaneously, engine 118 utilizes extraction model 116 to pull out relevant entities from the input. These entities provide the necessary details that the functions require to perform the desired task. Together, these models enable the engine 118 to dynamically execute the appropriate functions or workflows needed to fulfill the user's request, making the system flexible, adaptable, and capable of handling diverse tasks in real-time. In some embodiments, engine 118 may act as a central controller or orchestrator that determines which procedural functions should be executed to fulfill the user's request.

Consider an exemplary output from classification model 114 and extraction model 116 used by procedural function framework 112 to generate a partial and a full response.

```
RuntimeModelResult {
    data: [
        { loanStatus: 'Underwriting' },
        { firstName: 'SALLY', lastName: 'JONES' },
        { firstName: 'JACK', lastName: 'ANDERSON' }
    ],
    query: 'For loan 100100100100, what is the status and borrowers on
    file?', partialResponse: 'Loan status is underwriting. First name is sally,
    last name is jones, first name is jack, last name is anderson. ',
    fullResponse: 'The status of loan 100100100100 is underwriting. The
    borrowers on file are Sally Jones and Jack Anderson.'
```

For example, engine 118 may receive output from the classification model 114 (intents) and the extraction model 116 (entities) extracted from the query and execute one or more actions which will formulate the response for a query comprising raw data entered by the user: 'For loan 100100100100, what is the status and borrowers on file?'

In some embodiments, the engine 118 may be configured to generate a partial response. For example, in the exemplary output above, the "partialResponse" attribute includes value 'Loan status is underwriting. First name is sally, last name is jones, first name is jack, last name is anderson.' Accordingly, the partial response generated by engine 118 is 'Loan status is underwriting. First name is sally, last name is jones, first name is jack, last name is anderson.' In some embodiments, the partial response generated by the engine 118 may comprise the raw output data which has been transformed into a simplistic phrase to produce a partial response. The partial response generated by engine 118 may be submitted to LLM 140 to produce the final response. For example, the "fullResponse" generated by the LLM 140 may comprise 'The status of loan 100100100100 is underwriting. The borrowers on file are Sally Jones and Jack Anderson.'

In some embodiments, LLM 140 used to produce the final response may comprise a pre-trained LLM developed using an open-source LLM model (OpenChatKit) that uses 7 billion parameters and a Generative Pretrained Transformer (GPT) algorithm.

Figure 1B:
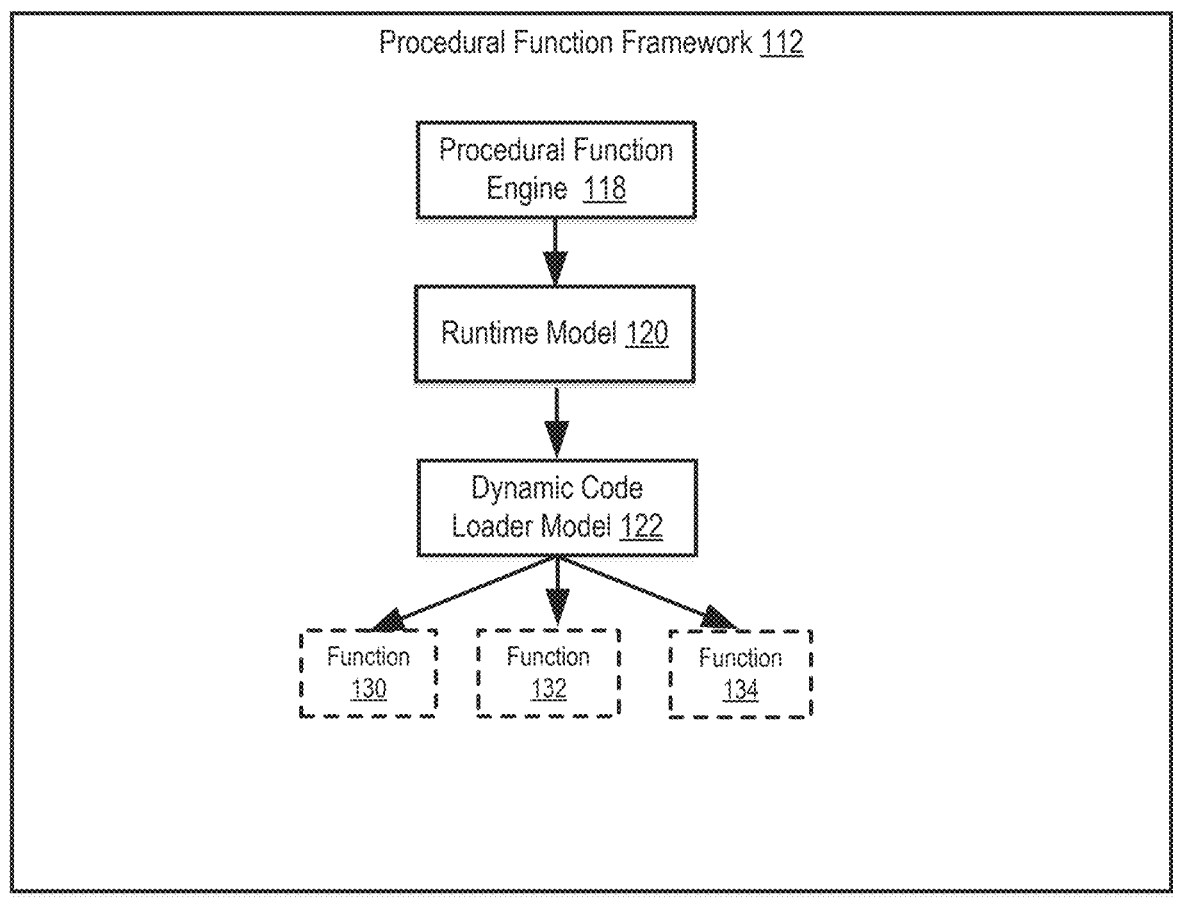
FIG. 1B illustrates an exemplary schematic diagram of a computer-based architecture of a procedural function framework of the system in FIG. 1A in greater detail, according to an implementation of the disclosure.

In some embodiments, procedural function framework 112 may comprise a runtime model, which is a specific component or module within the engine 118. For example, as illustrated in FIG. 1B, Runtime model 120 may be configured to execute the decisions made by the engine 118, particularly concerning which procedural functions to run and how they should be executed, as illustrated in FIG. 1B. Runtime model 120 may handle the real-time execution of procedural functions based on the intent and entity information provided by models 114 and 116, respectively. It serves as the runtime environment where decisions are operationalized—converting the output of the intent and entity detection into specific actions performed by the procedural functions. The runtime model 120 may use a command selector (not illustrated) to determine which procedural functions to execute based on the identified intents and extracted entities.

In some embodiments, runtime model 120 may comprise a dynamic code loader 122 that dynamically loads and executes the required procedural functions 130, 132, 134 based on the decisions made by the runtime model 120, ensuring that the right functions are run at the right time. A configuration file containing the list of all supported intents and the actions associated with them may be used.

Each of the functions 130, 132, 134 is a dynamic, procedural function or unit of execution that is created or utilized to perform specific tasks based on user queries. Multiple functions can be triggered to generate a complex response. Exemplary functions may include an API Call Function (e.g., for sending a request to an external API to fetch data or perform an action, a Data Processing Function (e.g., for processing input data to perform calculations, transformations, or analysis), a Web Search Function (e.g., for conducting a web search to find external information not available in the current dataset), an Interaction Function (e.g., for communicating with other AI systems or services to exchange information or trigger additional tasks).

In some embodiments, procedural functions 130-134, i.e., individual execution units may include logic-based routines, or task-specific scripts that perform discrete operations. For example, a function may include if/else logic. Such functions would not "learn" from data in the way neural networks do. Instead, they are invoked dynamically based on the identified intents and extracted entities to perform pre-determined actions. Unlike neural networks, which are trained models that learn patterns from data, functions that are rule-based or pre-defined are designed to execute specific tasks.

In some embodiments, procedural functions, i.e., individual executions units may use neural network functions that are designed to handle specific tasks associated with the intent. A neural network is a computational model inspired by the way biological neural networks in the human brain process information. It consists of interconnected layers of nodes (neurons) that work together to learn patterns, representations, and relationships in data.

For example, identifying 'get_loan_info' intent might activate a specific neural network node trained to handle functions like searching for borrower information, loan information, and checking status. Similarly, the extracted entities may serve as inputs or parameters for the neural network node. For example, the neural network node handling loan information would receive "synonyms" and "words" entities as inputs to predict the loan information. The neural network nodes may be dynamically invoked to manage specific actions such as querying databases, handling updates, or sending notifications, making the system flexible, adaptable, and capable of handling diverse tasks in real time. By utilizing a neural network for a computational model for the procedural function engine allows the engine to learn patterns and make predictions based on data including generating new functions.

In some embodiments, the runtime model 120 may be configured to execute the decisions made by the engine 118, particularly concerning which procedural functions to run and how they should be executed, as illustrated in FIG. 1B. Runtime model 120 may handle the real-time execution of procedural functions based on the intent and entity information provided by models 114 and 116, respectively.

Figure 2:
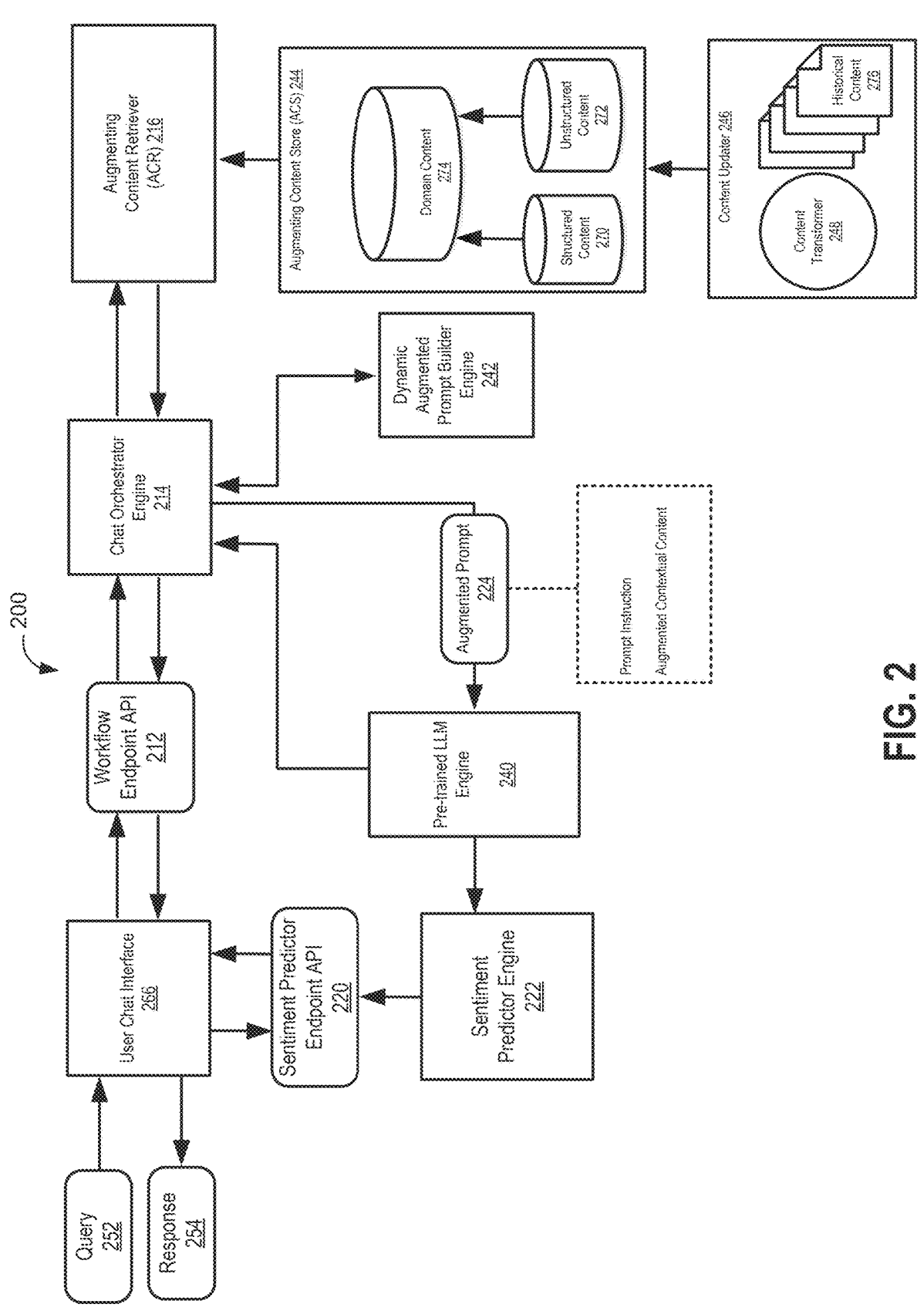
FIG. 2 illustrates an exemplary process of the domain-specific query answering and sentiment analysis system for responding to user queries of FIG. 1A, according to an implementation of the disclosure.

FIG. 2 is an illustrative process for generating a response to a user query using procedural functions generated and executed by the procedural function framework 112 of conversation engine 110, in accordance with some examples described herein. In example 200, a process associated with generating a response is illustrated using various system, including a system comprising a conversation engine. The system executing machine-readable instructions in example 200 may correspond with system 102 in FIG. 1A.

A new query 252 is provided to a user chat interface 266, which may be implemented with a system 102 illustrated in FIG. 1A and may correspond with query interface 166 in FIG. 1A. The user interface is provided for user to input natural language queries or questions.

Chat interface 266 simultaneously sends query 252 to a Q&R endpoint application programming interface ("API")

212 for question-answering tasks and to a sentiment predictor endpoint application programming interface ("API") 220 for sentiment detection tasks. The Q&R endpoint API 212 receives the user query from the user chat interface 266 and forwards it to the chat orchestrator engine 214 for processing. Chat orchestrator engine 214 may be a central coordination module that receives user query 252 from the Q&R endpoint API 212 and manages interactions with other system components. Chat orchestrator engine 214 orchestrates the retrieval of relevant content, prompt construction, and activation of the LLM for response generation.

Simultaneously, as the Q&R endpoint API 212 receives the query 252, the sentiment predictor endpoint API 220 also receives user query 252 and forwards the input to a sentiment predictor engine 222.

Sentiment predictor engine 222 utilizes LLM 240 to analyze the sentiment of the user input in "sentiment prediction mode," by generating a sentiment classification (e.g., "negative" or "non-negative"). The LLM 240 may be a pre-trained LLM and may comprise an open-source large language model (such as OpenChatKit) with generative capabilities, utilizing a generative pretrained transformer (GPT) algorithm. The LLM 240 may be invoked twice: first for sentiment analysis and second for generating a response based on the dynamically constructed prompt, as described herein.

The chat orchestrator engine 214 calls the augmenting content retriever (ACR) engine 216 to find relevant content from the augmenting content store (ACS) 244 using a semantic search engine. For example, the ACR engine 216 uses a semantic search engine (e.g., FAISS) to search for and retrieve content from the ACS 244 that semantically matches the user's query.

The ACS 244 comprises a repository pre-populated with domain-specific content, including private and confidential company data, organized for efficient retrieval. For example, the ACS 244 may include domain content data store 274, which may correspond with the domain content data store 174 in FIG. 1A. The ACS 244 may also dynamically incorporate content retrieved via API calls and database look-ups. In some embodiments, the ACS 244 may include workflows and/or chat interfaces generated in response to user queries.

The data in domain content datastore 274 may include to structured data 270 and unstructured data 272. The structured data 270 includes information that is typically organized in tables and can be queried using database management systems (DBMS) like SQL, NoSQL, or other types of databases. This data 270 is highly structured, following a specific schema or format (e.g., rows and columns in relational databases, document-based storage in NoSQL databases). Furthermore, this content 270 may be specific to the domain or business context of the company. It could include records such as customer information, transaction histories, inventory details, product catalogs, and other business-critical data. The content 270 can be dynamically updated as new data is entered or modified in the database. For example, structured data 270 may include information about customers, including contact details, transaction history, or preferences, details about products, such as specifications, pricing, availability, etc., and/or records of financial transactions, sales, or other business activities.

The unstructured data 272 includes content that is not stored in a structured database but is still specific to the company or domain. This content 272 could be in the form of documents, files, internal reports, manuals, emails, presentations, or any other format that is stored outside traditional databases. While data 272 it is specific to the organization's domain it is often unstructured (e.g., text documents, PDFs, presentations) or semi-structured (e.g., JSON files, XML data) and it resides in different formats and storage systems. The unstructured data 272 may come in various formats, such as Word documents, PDFs, images, spreadsheets, or even web pages within the company's intranet, and other similar formats. For example, unstructured data 272 may include employee handbooks, training manuals, policy documents, etc., as well as technical guides, troubleshooting documents, FAQs, sales presentations, quarterly reports, market research, and similar information. Both structured data 270 and unstructured data 272 play crucial roles in providing comprehensive answers to user queries. For example, when the ACR engine 216 retrieves content relevant to the user's query, that content may either be structured data 270 (i.e., data that directly answers or supports the user's question) or unstructured data 272 (i.e., by performing a semantic search (e.g., using FAISS) across unstructured or semi-structured content 272 to find documents, articles, or other files relevant to the query. Accordingly, the ACR engine 216 retrieves and integrates both structured data 270 and unstructured data 272 content and then used by the dynamic augmented prompt builder (DAPB) engine 242 to create a tailored prompt for the LLM 224, which includes instructions and the most relevant content slices so that the conversation allowing engine 110 can construct a comprehensive and context-aware response.

In some embodiments, the data in the ACS 244 is continuously updated and maintained with relevant and up-to-date content with a content updater 246. By using content updater 246, ensures that the content is used to enrich the responses generated by the system, ensuring that the answers provided are accurate, current, and contextually relevant.

The content updater 246 collects new data from multiple sources (such as external APIs, databases, real-time feeds, or internal repositories) and integrates this content into the ACS 244. It ensures that the information in the ACS 244 remains fresh and relevant by regularly adding new data and removing outdated or irrelevant information.

The content updater 246 dynamically enhances the knowledge base 244 by incorporating recent, domain-specific content that is pertinent to the user's queries. For example, if the system is used in a business setting, it may retrieve updated policy documents, pricing information, or FAQs that are then stored in the ACS 244 for future use. By keeping the ACS 244 up-to-date, the system is able to generate responses based on the latest available information, enhancing the accuracy and relevance of the answers provided to users.

The content updater 246 integrates with external content sources (such as APIs, web crawlers, or news feeds) and internal databases or knowledge management systems. This allows it to retrieve relevant content in real time, ensuring that the system always has access to the most current data. For example, in an enterprise scenario, content updater 246 may pull data from CRM systems, employee handbooks, or product catalogs to enrich responses to user queries.

Before updating the ACS 244, the content updater 246 preprocesses the content to ensure that it is properly formatted and indexed for fast retrieval. This may include removing irrelevant or sensitive data, parsing and structuring the content in a way that makes it easily searchable, creating metadata tags or labels that improve the accuracy of search results when the system queries the ACS 244. In some embodiments, content transformer 248 is configured in taking raw, unstructured, or semi-structured data (e.g., text, documents, files) retrieved by the content updater 246 from external APIs, internal databases, or other content sources and transforming it into a structured and useful format before it is stored in the ACS 244.

The content updater 246 works closely with the ACR engine 216 to ensure that the content retrieved during user interactions is relevant and up-to-date. The content updater 246 also collaborates with the dynamic augmented prompt builder (DAPB) engine 242 to ensure that the system has access to enriched content that can be used to build detailed and contextually relevant prompts for the LLM 240.

In some embodiments, historical content 276 is used to provide context and enhance the relevance of new content being added by the content updater 246. By referencing past content, the system can maintain continuity and context in responses. Historical content 276 could include previous chat interactions, older versions of documents, or past event data. This helps the system provide consistent answers that reflect both new information and historical trends or patterns. The content updater 246 can reference historical content 276 to identify trends or patterns that inform how new content should be integrated into the ACS 244. For instance, if a pattern of user queries shows increasing interest in a particular product or service, this may influence how content is prioritized and updated. By leveraging historical content 276, the system can predict what type of information might be most relevant based on previous interactions and update the store accordingly. When a user asks a question, the ACR engine 216 may pull both real-time and historical content 276 to ensure that the response is accurate and reflects any updates or changes over time. The content updater 246 ensures that historical and current data are harmonized in the ACS.

The chat orchestrator 214 sends the retrieved content to the dynamic augmented prompt builder (DAPB) engine 242, which may be configured to construct a prompt comprising an instruction and relevant content slices retrieved by the ACR engine 214. For example, the instruction of the prompt constructed by the DAPB engine 242 may comprise the following: "Find answer to the question—what is the minimum score required for your 30-year fixed FHA loan product to purchase a rental property, from the content provided in the next section." The constructed prompt is forwarded from the DAPB engine 242 to guide the LLM 240 in generating a contextually accurate response.

The response 254 is sent back to the chat orchestrator 214, which forwards it to the Q&R endpoint API 212 for delivery to the user via the chat interface 266.

The components described in FIG. 2 may be initiated as procedural functions of procedural function engine 118 of the conversation engine 110 described above. For example, when a user submits a query (e.g., a query 152 in FIG. 1A or query 252 in FIG. 2), the engine 118 may generate a procedural function to initiate the sentiment predictor engine 222. This function uses the pre-trained LLM 240 in "sentiment prediction mode" to analyze the sentiment of the input. Simultaneously, another procedural function may be generated to activate a chat orchestrator 214, which coordinates with the ACR engine 216 to search and retrieve relevant content from the ACS 244.

Once the relevant content is retrieved, the engine 118 may generate a procedural function to call the DAPB engine 242, which constructs a tailored prompt for the Pre-Trained LLM 240. This prompt combines the user's query with retrieved content to ensure that the response generated by the LLM 240 is accurate and context specific. The DAPB engine 242 creates an enriched or refined prompt that includes additional context or instructions, which can be fed to the LLM 140 (illustrated in FIG. 1) in the conversation engine 110 to enhance its understanding and improve the quality of the response. The ACR 216 fetches relevant data from various content stores (e.g., knowledge bases, databases such as 174 illustrated in FIG. 1A), which can be incorporated into the LLM's input to provide more comprehensive answers. The sentiment predictor engine 222 output can guide the LLM 240 (and LLM 140 in FIG. 1A) to adjust the tone or style of its responses based on the user's perceived sentiment, ensuring a more empathetic or appropriate reply.

The LLM component 140 in FIG. 1A (in the conversation engine 110) may include architecture that can be designed to take combined inputs from both: its own ecosystem (e.g., classification model 114, extraction model 116, and procedural function engine 118) and the components identified in FIG. 2. For example, the LLM 114 in FIG. 1A might receive enriched prompts that have been dynamically built by combining the output of the classification model 114, extraction model 116 with additional content fetched or generated by the FIG. 2 components described above. Further, the LLM component 140 in FIG. 1A (in the conversation engine 110) can use outputs from FIG. 2, like data retrieved by the ACR engine 216 (in FIG. 2), to answer user queries more accurately by leveraging updated or external data sources. Inputs such as sentiment analysis results or context from the chat orchestrator 214 can be used by the LLM 140 (in FIG. 1A) to adapt its responses to be more relevant and aligned with user expectations.

In some embodiments, some of the engines and/or components in system 102 may be characterized by being synchronous or asynchronous. Synchronous engines and/or components operate in a sequential, blocking manner, meaning they perform their tasks in a specific order and wait for each step to complete before moving on to the next one. These components require an immediate response or result before continuing to the next operation. For example, a synchronous component, waits for the completion of its current task before proceeding to the next task. It does not perform other operations while waiting. Each task is executed in a predefined order, one after another. These components need an immediate result or output from their processes to continue, which can make them more predictable but less flexible in handling multiple tasks simultaneously.

For example, the chat orchestrator engine 214 may operate synchronously to ensure that it sequentially coordinates all steps necessary for generating a response. It may wait for the ACR engine 216 to finish retrieving content before moving to the next step (e.g., such as passing content to the dynamic augmented prompt builder (DAPB) 242). DAPB engine 242 in turn constructs a prompt for the LLM 240 based on the content retrieved. DAPB engine 242 operates synchronously in that it waits for all necessary content to be available before creating and forwarding the prompt to the LLM 240. Finally, LLM 240 may be invoked synchronously to generate a response based on the constructed prompt, meaning that the system waits for the LLM 240 to complete its generation task before continuing to the next process.

By contrast, asynchronous components operate in a non-blocking manner, meaning they initiate tasks that run independently and do not wait for those tasks to complete before moving on to other operations. These components can handle multiple tasks concurrently and do not require immediate responses to continue processing. For example, an asynchronous component does not wait for a task to complete before starting another task. It can handle multiple tasks simultaneously. Tasks can be executed in parallel or independently, allowing for more flexible and efficient use of system resources. Often, asynchronous modules use event-driven mechanisms or callbacks to handle tasks once they are completed.

In some embodiments, sentiment predictor engine 222 may be configured to operate asynchronously, allowing the sentiment predictor endpoint API 220 to send the user's input to the LLM 240 in a "sentiment prediction mode" without blocking other processes (like content retrieval or prompt construction). Once the sentiment analysis is complete, the result can be asynchronously passed back to the relevant module or process. The ACR engine 216 may be configured to perform content retrieval asynchronously, enabling the system to start retrieving content from the ACS 244 while other tasks are being processed in parallel. This can speed up the overall workflow by ensuring that content retrieval does not block other tasks.

Synchronous operations (e.g., chat orchestrator engine 214, DAPB engine 242, and/or LLM 240) ensure that critical steps requiring a defined sequence (like prompt construction and LLM response generation) are executed in order, maintaining coherence and accuracy in the response. Asynchronous operations (e.g., ACR engine 216 and/or ACS 244) allow the system to perform background tasks (like sentiment detection or content retrieval) concurrently, reducing delays and optimizing overall processing time. By virtue of combining both types of modules allows the system to optimize performance, ensuring accurate and context-aware responses while maintaining efficiency and scalability.

AI drift occurs when a machine learning model's performance degrades over time due to changes in the underlying data distribution or evolving user behavior and requirements. This can lead to inaccuracies in the model's predictions or outputs, necessitating frequent retraining to maintain performance. The described system 102 minimizes or eliminates AI drift by using a well-trained, pre-trained LLM 140 (and LLM 240 in FIG. 2) that is robust and comprehensive in its understanding of natural language. Instead of relying on the LLM to store domain-specific knowledge that may change over time, the system dynamically retrieves the most relevant and up-to-date content at runtime using ACR engine 216 and ACS 244 illustrated in FIG. 2. By decoupling the LLM 140 and/or 240 from domain-specific content that might evolve, the system ensures that the LLM 140 and/or 240 remains effective over time without the need for retraining. The LLM 140 and/or 240 generates responses based on dynamically retrieved content, which is always current, thus preventing drift caused by outdated information. The system 102 maintains high accuracy in its outputs by continuously using up-to-date domain-specific content without modifying the core LLM 140 and/or 240.

Since the LLM 140 and/or 240 does not directly handle evolving content, its understanding of language remains consistent, avoiding drift and ensuring stable performance. Eliminating AI drift reduces the need for ongoing monitoring, evaluation, and correction of model performance, resulting in lower maintenance overhead.

In traditional AI and machine learning systems, retraining is required whenever there is a significant change in domain-specific content or user behavior. Retraining an LLM is a resource-intensive process that requires substantial computational power, time, and data. It also involves high costs associated with cloud infrastructure, storage, and human resources.

The disclosed system 102 avoids the need for retraining by leveraging a pre-trained, generic LLM 140 and/or 240 combined with a dynamic content retrieval approach. Instead of embedding domain-specific knowledge directly within the LLM 140 and/or 240, the system 102 dynamically retrieves relevant content from the ACR engine 216 and ACS 244, illustrated in FIG. 2, and feeds this content to the LLM 140 and/or 240 at runtime. The conversation engine 110 dynamically generates procedural functions that guide the retrieval of up-to-date content and construct enriched prompts for the LLM 140 and/or 240, ensuring that the LLM 140 and/or 240 always operates with the most relevant information without requiring any updates to its core training.

By eliminating the need for frequent retraining, the system significantly reduces computational costs and energy consumption. It avoids the expenses associated with the infrastructure and human resources required for training large-scale models. The conversation engine 110 can easily scale across different domains and datasets without the overhead of retraining. New data sources and business scenarios can be integrated by updating the content retrieval mechanisms rather than modifying the LLM 140 and/or 240 itself. The system 102 remains lightweight and efficient, using minimal CPU and GPU resources. The pre-trained LLM 140 and/or 240 does not need to be retrained, which makes the architecture suitable for real-time applications where low latency and quick response times are crucial. The system 102 can rapidly adapt to changes in domain-specific content or user needs by updating the content in the ACS 244 illustrated in FIG. 2 rather than retraining the LLM 140 and/or 240. This allows the system to handle dynamic and evolving business requirements efficiently.

Figure 3:
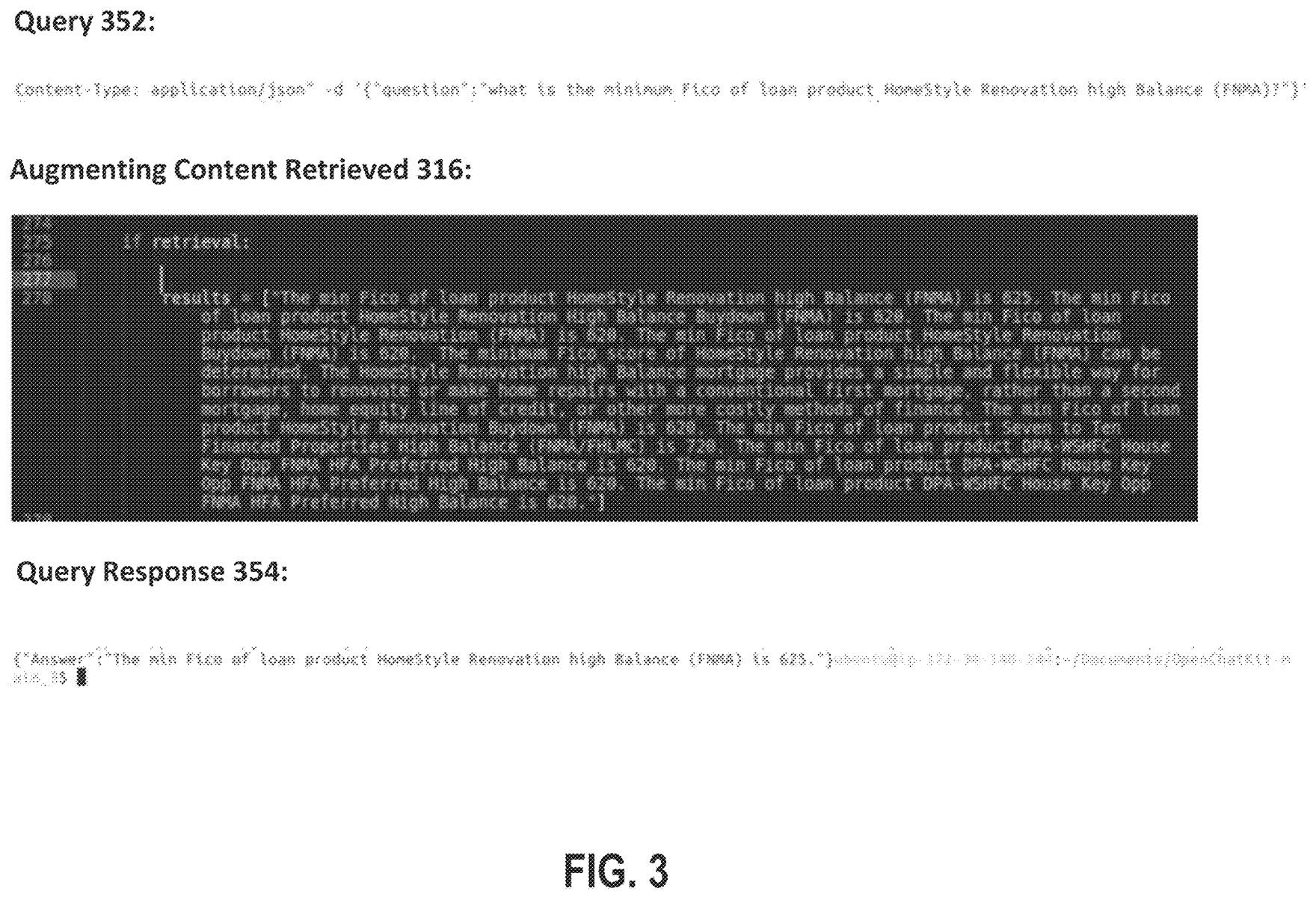
Figure 4:
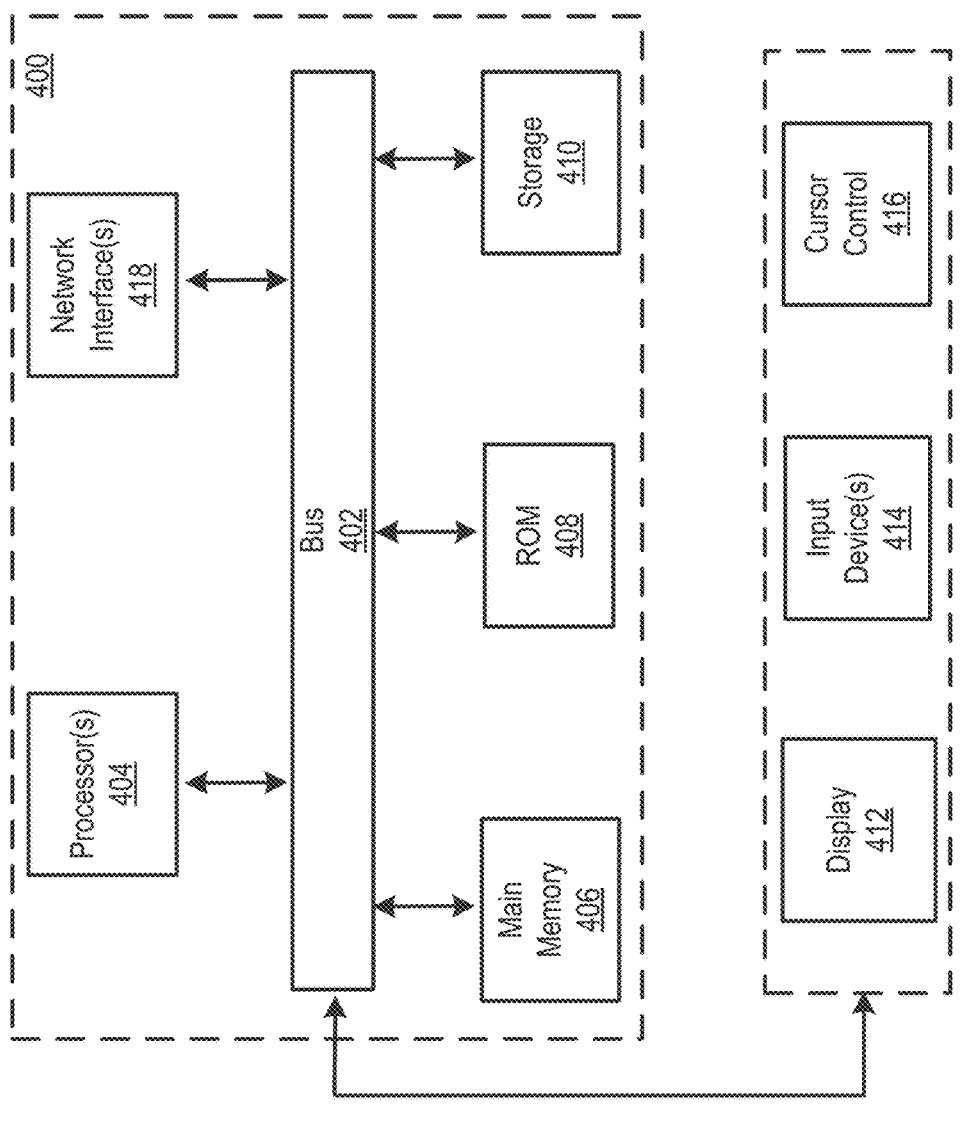
FIG. 4 illustrates an example computing system that may be used in implementing various features of embodiments of the disclosed technology.

FIG. 3 illustrates a query response 354 generated by the exemplary system 102 illustrated in FIG. 1A in response to user query 352. The user query 352 comprises text "what is the minimum Fico of loan product HomeStye Renovation high Balance (FNMA)?" The query response 354 generated by the system 102 comprises text "The min Fico of loan product HomeStye Renovation high Balance (FNMA) is 625."

Where components, logical circuits, or engines of the technology are implemented in whole or in part using software, in one embodiment, these software elements can be implemented to operate with a computing or logical circuit capable of carrying out the functionality described with respect thereto. One such example computing module is shown in FIG. 4. Various embodiments are described in terms of this example computing module 400. After reading this description, it will become apparent to a person skilled in the relevant art how to implement the technology using other logical circuits or architectures.

FIG. 4 illustrates an example computing module 400, an example of which may be a processor/controller resident on a mobile device, or a processor/controller used to operate a payment transaction device, that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the application using other computing modules or architectures.

Referring now to FIG. 4, computing module 400 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally. The bus 402 may also be connected to other components such as a display 412, input devices 414, or cursor control 416 to help facilitate interaction and communications between the processor and/or other components of the computing module 400.

Computing module 400 might also include one or more memory modules, simply referred to herein as main memory 406. For example, preferably random-access memory (RAM) or other dynamic memory might be used for storing information and instructions to be executed by processor 404. Main memory 406 might also be used for storing temporary variables or other intermediate information during execution of instructions to be executed by processor 404. Computing module 400 might likewise include a read only memory ("ROM") 408 or other static storage device 410 coupled to bus 402 for storing static information and instructions for processor 404.

Computing module 400 might also include one or more various forms of information storage devices 410, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to or accessed by media drive. As these examples illustrate, the storage media can include a computer usable storage medium having stored therein computer software or data.

In alternative embodiments, information storage devices 410 might include other similar instrumentalities for allowing computer programs or other instructions or data to be loaded into computing module 400. Such instrumentalities might include, for example, a fixed or removable storage unit and a storage unit interface. Examples of such storage units and storage unit interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module 400.

Computing module 400 might also include a communications interface or network interface(s) 418. Communications or network interface(s) interface 418 might be used to allow software and data to be transferred between computing module 400 and external devices. Examples of communications interface or network interface(s) 418 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications or network interface(s) 418 might typically be carried on signals, which can be electronic, electromagnetic (which includes optical) or other signals capable of being exchanged by a given communications interface. These signals might be provided to communications interface 418 via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 406, ROM 408, and storage unit interface 410. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
receiving a query from a client;
initiating a classification process of the query that generates an action attribute for the query;

initiating an extraction process of the query that generates a parameter attribute for the action attribute of the query;

initiating a plurality of parameter functions based on the parameter attribute that generate at least one or more outputs; and generating, using a large language model (LLM), a response to the query using the action attribute generated by the classification process, the parameter attribute generated by the extraction process, and the one or more outputs generated by the plurality of parameter functions;

wherein the outputs generated by the plurality of parameter functions comprise at least generating a sentiment classification, generating semantically similar content, and generating a dynamically constructed prompt, wherein receiving the query comprises simultaneously transmitting the query to (i) a question-and-response endpoint application programming interface (API) and (ii) a sentiment predictor endpoint API, wherein generating the sentiment classification comprises the sentiment predictor endpoint API forwarding the query to a sentiment predictor engine that invokes a pre-trained LLM in a sentiment prediction mode to output the sentiment classification, wherein generating the semantically similar content comprises initiating an augmenting content retriever engine that obtains semantically similar content to the query from an augmenting content store using a semantic search engine, wherein the augmenting content store is maintained by a content updater that adds new domain-specific content and removes content items that are superseded by newer versions of corresponding content items stored in the augmenting content store, wherein generating the dynamically constructed prompt comprises a dynamic augmented prompt builder constructing an enriched prompt by combining (a) the query, (b) the action attribute, (c) the parameter attribute, (d) the sentiment classification, and (e) the semantically similar content obtained from the augmenting content store, and wherein generating the response comprises invoking the pre-trained LLM using the enriched prompt to generate the response.

2. The computer-implemented method of claim 1, wherein generating the sentiment classification associated with outputs generated by the plurality of parameter functions comprises initiating a sentiment classification process that uses the LLM to generate a sentiment for the query.

3. The computer-implemented method of claim 1, wherein generating semantically similar content comprises initiating a semantic search engine that obtains semantically similar content to the query from a content specific data store.

4. The computer-implemented method of claim 1, wherein generating the dynamically constructed prompt comprises using the semantically similar content generated by initiating the semantic search engine.

5. The computer-implemented method of claim 1, wherein the classification process and the extraction process of the query each comprise an artificial intelligence (AI) model, wherein the AI model is trained using labeled domain-specific data.

6. The computer-implemented method of claim 1, wherein the LLM comprises a pre-trained LLM and a Generative Pretrained Transformer (GPT).

7. The computer-implemented method of claim 1, wherein the action attribute of the query specifies an intent of a user, wherein the user is associated with the client.

8. The computer-implemented method of claim 7, wherein the parameter attribute of the query specifies a set of parameters associated with the intent of the user.

9. The computer-implemented method of claim 1, wherein the response comprises information requested in the query.

10. A system comprising:

one or more computing processors; and a non-transitory machine-readable storage medium storing instructions that, when executed by the one or more processors, cause the system to:

receive a query from a client;

initiate a classification process of the query that generates an action attribute for the query;

initiate an extraction process of the query that generates a parameter attribute for the action attribute of the query;

initiate a plurality of parameter functions based on the parameter attribute that generate at least one or more outputs; and generate, using a large language model (LLM), a response to the query using the action attribute generated by the classification process, the parameter attribute generated by the extraction process, and the one or more outputs generated by the plurality of parameter functions;

wherein the outputs generated by the plurality of parameter functions comprise at least a sentiment classification, a semantically similar content and a dynamically constructed prompt, wherein receiving the query comprises simultaneously transmitting the query to (i) a question-and-response endpoint application programming interface (API) and (ii) a sentiment predictor endpoint API, wherein generating the sentiment classification comprises the sentiment predictor endpoint API forwarding the query to a sentiment predictor engine that invokes a pre-trained LLM in a sentiment prediction mode to output the sentiment classification, wherein generating the semantically similar content comprises initiating an augmenting content retriever engine that obtains semantically similar content to the query from an augmenting content store using a semantic search engine, wherein the augmenting content store is maintained by a content updater that adds new domain-specific content and removes content items that are superseded by newer versions of corresponding content items stored in the augmenting content store, wherein generating the dynamically constructed prompt comprises a dynamic augmented prompt builder constructing an enriched prompt by combining (a) the query, (b) the action attribute, (c) the parameter attribute, (d) the sentiment classification, and (e) the semantically similar content obtained from the augmenting content store, and wherein generating the response comprises invoking the pre-trained LLM using the enriched prompt to generate the response.

11. The system of claim 10, wherein the sentiment classification associated with the outputs generated by the plurality of parameter functions comprises initiating a sentiment classification process that uses the LLM to generate a sentiment for the query.

12. The system of claim 10, wherein the semantically similar content comprises initiating a semantic search engine that obtains semantically similar content to the query from a content specific data store.

13. The system of claim 10, wherein the dynamically constructed prompt comprises the semantically similar content generated by initiating the semantic search engine.

14. The system of claim 10, wherein the classification process and the extraction process of the query each comprise an artificial intelligence (AI) model, wherein the AI model is trained using labeled domain-specific data.

15. The system of claim 10, wherein the LLM comprises a pre-trained LLM and a Generative Pretrained Transformer (GPT).

16. The system of claim 10, wherein the action attribute of the query specifies an intent of a user, wherein the user is associated with the client.

17. The system of claim 16, wherein the parameter attribute of the query specifies a set of parameters associated with the intent of the user.

18. The system of claim 10, wherein the response comprises information requested in the query.

\* \* \* \* \*